(12) United States Patent
Herzig

(10) Patent No.: US 7,973,120 B2
(45) Date of Patent: Jul. 5, 2011

(54) ENAMINE OILS AND METHOD FOR THE PRODUCTION THEREOF

(75) Inventor: Christian Herzig, Waging (DE)

(73) Assignee: Wacker Chemie AG, Munich (DE)

( * ) Notice: Subject to any disclaimer, the term of this patent is extended or adjusted under 35 U.S.C. 154(b) by 309 days.

(21) Appl. No.: 12/096,300

(22) PCT Filed: Nov. 23, 2006

(86) PCT No.: PCT/EP2006/068796
§ 371 (c)(1),
(2), (4) Date: Jun. 5, 2008

(87) PCT Pub. No.: WO2007/065798
PCT Pub. Date: Jun. 14, 2007

(65) Prior Publication Data
US 2008/0312398 A1    Dec. 18, 2008

(30) Foreign Application Priority Data

Dec. 8, 2005 (DE) .......................... 10 2005 058 745

(51) Int. Cl.
*C08G 77/20* (2006.01)
*C08G 77/14* (2006.01)

(52) U.S. Cl. ........................................ 528/26; 528/41

(58) Field of Classification Search .................. 528/26
See application file for complete search history.

(56) References Cited

U.S. PATENT DOCUMENTS

| 3,542,855 A | 11/1970 | Moschel et al. |
| 3,668,183 A * | 6/1972 | Hoy et al. ............... 528/228 |
| 5,242,978 A | 9/1993 | Schafer et al. |
| 6,121,404 A | 9/2000 | Liles et al. |

FOREIGN PATENT DOCUMENTS

| EP | 0 603 716 A1 | 6/1994 |
| EP | 0 481 345 B1 | 8/1994 |
| EP | 0 483 583 B1 | 5/1996 |
| GB | 1 154 726 | 6/1969 |
| GB | 1 218 509 | 1/1971 |

OTHER PUBLICATIONS

Patbase Abstract corresponds to EP 0 481 345.

* cited by examiner

*Primary Examiner* — Ling-Siu Choi
*Assistant Examiner* — Chun-Cheng Wang
(74) *Attorney, Agent, or Firm* — Brooks Kushman P.C.

(57) ABSTRACT

Organosilicon compounds containing at least one silicon-bonded radical of the formula

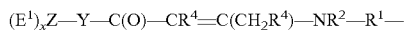

are prepared by reacting the analogous ketoester or tautomer thereof with an amino functional organosilicon compound.

13 Claims, No Drawings

ENAMINE OILS AND METHOD FOR THE PRODUCTION THEREOF

CROSS-REFERENCE TO RELATED APPLICATION

This application is the U.S. national phase of PCT Appln. No. PCT/EP2006/068796 filed Nov. 23, 2006 which claims priority to German application 10 2005 058 745.3 filed Dec. 8, 2005.

BACKGROUND OF THE INVENTION

1. Field of the Invention

The invention relates to enamine oils and a method for the production thereof.

2. Description of the Related Art

The preparation of polyacetoacetates and polyaceto-acetamides from polyols and polyamines, respectively, by reaction with diketene or by transesterification is described in U.S. Pat. No. 3,668,183. Further information on the derivatization of polycarbinols with diketene is to be found in U.S. Pat. No. 3,542,855. Methods for the reaction of polymeric compounds, such as polyethers, polyacetates, polyetheracetals, polyesters, polyesterpolyols, with diketene or acetoacetates are disclosed in GB 1154726 and GB 1218509. The polymers used contain at least one carbinol group and the products accordingly contain at least one acetoacetyl group.

The preparation of acetoacetylated silicone polyethoxylates is described in U.S. Pat. No. 6,121,404, linear siloxanes having terminal and also lateral propyl polyethoxylates being used. The reaction is effected with diketene.

According to EP 603716, acetoacetylated polyols, polyethers or polyesters are used for the preparation of elastomers by crosslinking them by addition of aminopolyesters or aminopolyethers. The latter are synthesized from the former by addition of an excess of polyamine.

Coating materials which cure within several hours are obtained according to EP 481345 if compounds having more than one acetoacetate group are mixed with polyamines which were converted beforehand with aldehydes or ketones into aldimines or ketimines. A comparable method is also described in U.S. Pat. No. 3,668,183, it also being possible here to use polyacetoacetamides. EP 483583 describes the formation of elastomers from polyacetoacetamides or -esters after reaction with aminosilanes without the presence of atmospheric humidity.

A special case of film formation is described in U.S. Pat. No. 6,121,404: an aqueous solution is prepared from an acetoacetylated silicone polyether and, after addition of aminosiloxane, is dried and forms an elastomer film.

SUMMARY OF THE INVENTION

The present invention relates to an organosilicon compound (1) which contains at least one Si-bonded radical of the general formula $$(E^1)_x Z—Y—C(O)—CR^4=C(CH_2R^4)—NR_2—R^1— \quad (I)$$

which can be prepared by the reaction of an aminosilicon compound (2) with a compound (3) of the general formula $$(E^2)_x Z—Y—C(O)—CR^4=C(CH_2R^4)—OH \quad (II) \text{ or}$$

$$(E^2)_x Z—Y—C(O)—CHR^4—C(O)—CH_2R^4 \quad (III)$$

in which
$R^1$ is an organic radical which may contain one or more N atoms,
$R^2$ is a hydrogen radical or an organic radical having 1 to 30 C atoms,
$R^4$ is a hydrogen radical or a hydrocarbon radical having 1 to 18 C atoms,
Y is O or NR
Z is a bi- to hexafunctional organic radical which has a monomeric, oligomeric or polymeric structure and a heteroatom content of at least 10% by weight and is bonded via C atoms,
$E^1$ is a monofunctional terminal group or an Si—C-bonded radical of the general formula —Y—C(O)—CR$^4$=C(CH$_2$R$^4$)—NR$^2$—R$^1$—,
$E^2$ is a monofunctional terminal group or a radical of the general formula —Y—C(O)—CR$^4$=C(CH$_2$R$^4$)—OH or —Y—C(O)—CHR$^4$—C(O)—CH$_2$R$^4$,
x is an integer from 1 to 5.

$R^1$ is preferably a bifunctional hydrocarbon radical which may contain one or more N atoms, and in the nitrogen-free form, corresponds to an alkylene, arylene or aralkylene radical, alkylene radicals being preferred. Examples of these are diradicals with the formulae —CH$_2$—, —C$_2$H$_4$— and —C$_6$H$_{12}$—. In the nitrogen atom-containing form, $R^1$ contains the N preferably isolated from further N atoms and in the form of secondary or tertiary amino groups. It is therefore particularly preferred if two N atoms are not bonded directly to one another. Examples are the groups of the formulae —C$_3$H$_6$NHC$_2$H$_4$—, —C$_3$H$_6$N(CH$_3$)C$_2$H$_4$—, —C$_3$H$_6$NHC$_3$H$_6$—, —C$_3$H$_6$NHC$_2$H$_4$NHC$_2$H$_4$—, —C$_3$H$_6$N(CH$_3$)C$_2$H$_4$N(CH$_3$)C$_2$H$_4$— or —C$_3$H$_6$NHC$_3$H$_6$NHC$_3$H$_6$—.

$R^2$ is preferably a hydrogen radical, $R^4$ is preferably a hydrogen radical, and Y is preferably an oxygen radical.

Z preferably has a heteroatom content of at least 20% by weight and more preferably at least 25% by weight.

x is preferably 1.

The invention furthermore relates to a method for the production of an organosilicon compound (1) wherein an aminosilicon compound (2) is reacted with a compound (3) of the general formula $$(E^2)_x Z—Y—C(O)—CR^4=C(CH_2R^4)—OH \quad (II) \text{ or}$$

$$(E^2)_x Z—Y—C(O)—CHR^4—C(O)—CH_2R^4 \quad (III)$$

in which
$R^1$ is an organic radical which may contain one or more N atoms,
$R^2$ is a hydrogen radical or an organic radical having 1 to 30 C atoms,
$R^4$ is a hydrogen radical or a hydrocarbon radical having 1 to 18 C atoms,
Y is O or NR$^2$,
Z is a bi- to hexafunctional organic radical which has a monomeric, oligomeric or polymeric structure and a heteroatom content of at least 10% by weight and is bonded via C atoms,
$E^2$ is a monofunctional terminal group or a radical of the general formula —Y—C(O)—CR$^4$=C(CH$_2$R$^4$)—OH or —Y—C(O)—CHR$^4$—C(O)—CH$_2$R$^4$,
x is an integer from 1 to 5.

The aminosilicon compound (2) is preferably an aminosiloxane which contains primary amino groups. If appropriate, the aminosiloxane may additionally contain secondary amino groups.

The aminosilicon compound (2) is more preferably a compound having Si-bonded substituents of the formula

in which $R^1$ and $R^2$ have the abovementioned meaning. Preferably, the aminosilicon compound (2) undergoes an addition reaction with the compound (3) in the absence of water.

Preferably the compounds (2) are used without prior conversion of the amino groups by means of reagents having protective groups, such as aldehydes or ketones. They preferably contain at least one primary amino group. Examples of these are the aminomethyl or the aminopropyl group.

If the aminosilicon compounds (2) are prepared from "diamino" monomers, such as aminoethylaminopropyl- or aminoethylaminoisobutylsilanes, they contain one secondary amino group bonded to the same Si atom per primary amino group. Preferably, however, the primary amino group reacts with compounds (3), secondary amino groups being retained as basic centers and therefore also being capable of being protonated.

The compound (2) preferably contains an amino group concentration in the range from 0.01 to about 10 meq/g, more preferably from about 0.05 to 5 meq/g. Preferred viscosities are in the range from about 100 to 100,000 mPa·s at 25° C., the range from 500 to 50,000 mPa·s being particularly preferred.

The organic compound (3) can be used as a reactant for the aminosilicon compound (2) in two tautomeric forms which correspond to the formulae (II) and (III). These compounds are obtained by reacting the parent compounds $(E^2)_xZ$—Y (4), which are saturated at the free valences with hydrogen, with diketene, acetylketene, alkyldiketene, diketene-acetone adduct or acetoacetates by reactions known in the literature. The reaction of diketene or the acetone adduct thereof is preferred.

The radical "Z" is an organic radical which, owing to its bi- to hexafunctionality, is linked to 2 to 6 further groups. The sum of "E" plus "Y" corresponds in its numerical value to this functionality. In the simplest case, which is also preferred, "Z" is bifunctional. In this case, "Z" is bonded to either two Y groups or one Y group and one monofunctional terminal group. Monofunctional terminal groups may be saturated or unsaturated hydrocarbon radicals, or acyl radicals, such as the acetate, butyrate, palmitate or stearate radical, as well as the acrylate, methacrylate or benzoate radical.

The radical "Z" has a heteroatom content of at least 10% by weight. The heteroatoms are selected from the group consisting of the 0, N, B, P and S atoms; O and N atoms are preferred, preferably O atoms. The radical "Z" has the function of introducing higher polarity and hence a higher degree of hydrophilicity into the compounds (1), and it is for this reason that a relatively high content of heteroatoms is preferred. The radical "Z" is most preferably a polyether or polyester. Examples of polyethers are polyethylene oxide, polypropylene oxide or polybutylene oxide (also poly-THF) and copolymers of the general formula $(C_aH_{2a}O)_nC_aH_{2a}$ where a=2, 3 or 4 and n is an integer from 1 to 500, preferably from 1 to 100.

Tri- to hexafunctional radicals "Z" are usually initiated from alcohols as well as from amines having the same functionality. Thus, with ethylene oxide, trimethylolpropane or ammonia give parent compounds (4) with "Z" of the general formula $C_2H_5C(CH_2(OC_2H_4)_{n/3})_3$ or $N(C_2H_4(OC_2H_4)_{n-3/3})_3$, whose free valences are linked to oxygen atoms (Y), which in turn are saturated with hydrogen. For the preparation of compounds (4) having a relatively high functionality, the carbinol or amino compounds having a correspondingly higher functionality are usually used: tetrafunctionality from pentaerythritol or ethylenediamine, hexafunctionality from sorbitol or tris(aminoethyl)amine.

Corresponding polyesters can be prepared from the same or similar initiator compounds by ring-opening polymerization of cyclic esters (lactones) by generally known methods. Preferred parent compounds (4) are polyethylene glycol, polypropylene glycol and copolymers thereof and monoalkyl ethers thereof. The latter are a special case where "Y" is oxygen and "E" is an alkyl group (methyl, ethyl, propyl, butyl). Regarding the reaction to give compounds (3), these compounds (4) are monofunctional. Compared with the aminosilicon compounds (2), the compounds (3) prepared therefrom are likewise monofunctional and accordingly serve for saturating amino groups with polar polymers.

In contrast, the reactants (3) which are likewise bifunctional with respect to the compounds (2) and therefore have a chain-extending effect are obtained from polyalkylene glycols. In this way, it is also possible to obtain branched products (1), provided that the compounds (2) contain at least three amino groups per molecule. An alternating siloxane-polyether structure forms.

The reaction of the compounds (3) with (primary) aminosilicon compounds (2) to give the β-ketoenamines (1) according to the invention takes place spontaneously even without external heating, but the supply of heat accelerates the synthesis of (1). In principle, the compounds (2) and (3) can be combined with one another and reacted within wide limits. A stoichiometric excess of β-ketocarbonyl groups (or the enol tautomers thereof) in relation to amino groups does of course lead to products which contain excess β-ketocarbonyl groups, and vice versa. In order to avoid this case, a stoichiometric ratio of β-ketocarbonyl groups to primary amino groups of 0.8 to 1.2, more preferably of 0.9 to 1.1, is preferably used.

If compounds (3) having more than only one β-keto-carbonyl group (or the enol tautomer thereof) per molecule are used, it may be necessary, depending on the aim of the synthesis, to deviate from these molar ratios, either to establish molecular weights of the products or very simply to avoid gelling effects. In such cases, the molar ratio of the reacting groups may vary from about 0.1 to about 10.

The reaction temperature is preferably from 0 to about 140° C., more preferably from 20 to about 100° C.

The ambient pressure is less critical. Reaction under atmospheric pressure or in vacuo is preferred. If the water of reaction is removed in vacuo, this generally leads to an increase in the reaction rate. Even in cases where the water of reaction is not completely soluble in the product, the removal thereof is advantageous since clear products are obtained.

The following examples serve for further explanation of the invention.

EXAMPLE 1

125 g of a commercially available aminosiloxane which consists of 3-(aminoethylamino)propylmethylsilyloxy and dimethylsilyloxy units and has an amine content of 0.293 meq/g at a viscosity of 980 mm²/s (25° C.) are initially introduced at 25° C. Without supplying external heat, 10.2 g of a methylpolyethylene glycol acetoacetate having an average degree of polymerization of 10.4 are metered in. The milky opaque mixture warms up slightly and becomes more viscous. Stirring is continued until a clear, yellowish siloxane-polyether copolymer is obtained. The $^1$H-NMR spectrum shows complete conversion of the acetoacetate to the enamine in that the signal of the acetyl group at 2.3 ppm is no longer detectable and instead the methyl group of the enamine is visible at 1.9 ppm as a singlet. The copolymer contains the structural unit (polyether)—O$_2$C—CH═C(CH$_3$)—NH—C$_2$H$_4$—NH—C$_3$H$_6$—(siloxane).

EXAMPLE 2

The procedure is analogous to Example 1, but 47 g of a telechelic aminosiloxane comprising 3-(aminoethyl-amino) propyldimethylsilyloxy and dimethylsilyloxy units and having an amine number of 0.78 are used instead of the 125 g of the aminosiloxane from Example 1. The mixture with an identical amount of the acetoacetate is initially also very turbid but it clears on weakly exothermic reaction toward the end. The reaction is complete after about 24 hours without external heating, which is confirmed by the $^1$H-NMR spectrum. The structural element between polyether and siloxane corresponds to that of the copolymer from Example 1.

EXAMPLE 3

47 g of the telechelic aminosiloxane from Example 2 are mixed at 25° C. with 35.5 g of butyl(polyethylene)-(polypropylene)-glycol acetoacetate having equimolar ethylene and propylene moieties and an average molar mass of 1970 g, the starting materials being completely incompatible. On thorough stirring, the mixture clears at 50° C. after about 4 hours, and a yellowish highly viscous oil is obtained. In the $^1$H-NMR spectrum, the product is detectable from the new singlet of the CH$_3$ group of the enamine at 1.9 ppm in combination with the absence of the acetyl peak (2.3 ppm). The structural element between polyether and siloxane corresponds to that of the copolymer from Example 1.

EXAMPLE 4

35.5 g of the polyether acetoacetate from Example 3 are reacted with an aminosiloxane which contains exclusively primary amino groups and no combination of primary/secondary amino groups. For this purpose, 95 g of a telechelic aminopropyl-PDMS having an amino group content of 0.38 meq/g are metered in with vigorous stirring. After clarification of the reaction mixture, stirring is effected for a further 2 hours at 50° C. A clear, yellowish oil which once again has the CH$_3$ peak of the enamine at 1.9 ppm in the $^1$H-NMR spectrum is obtained: the structure of the terminal groups corresponds to the structural element:

(polyether)-O$_2$C—CH═C(CH$_3$)—NH—C$_3$H$_6$— (siloxane)

EXAMPLE 5

195.4 g of dewatered polyethylene glycol having on average 44 ethyleneoxy units are reacted with 18.0 g of diketene at 80° C. to give the bisacetoacetate (catalyst 0.1 g of diazabicyclooctane), and the excess diketene is then removed in vacuo. After cooling to 25° C., a total of 192.5 g of a telechelic silicone oil having 3-aminopropyl terminal groups and an amine concentration of 0.52 meq/g are metered in. With thorough stirring, the initially milky mixture clarifies on gentle heating. Thereafter, the reaction is allowed to continue for a further 2 hours at 50° C., and a yellowish, highly viscous oil having a β-keto-enamine concentration of about 0.25 meq/g is obtained. In the $^1$H-NMR spectrum, no free aminopropyl-(Si) groups are detectable, but the same structural element as in the product of Example 4. The polymer is dispersible in water without addition of emulsifier.

EXAMPLE 6

The product from Example 5 contains terminal β-ketoester groups which can be further reacted: 202 g of this product (50 meq of acetoacetate) are diluted with 50 g of THF and then mixed with 5.2 g of dimethylamino-propylamine at 25° C. In a slightly exothermic reaction, a telechelic PDMS-polyether copolymer which contains polymer segments linked via β-ketoenamine groups and is endcapped with tertiary amine groups is obtained after 2 hours. The concentration of the tertiary amine groups is 0.24 meq/g. In the $^1$H-NMR spectrum, the same structural elements as in the product of Example 4 are confirmed.

EXAMPLE 7

As in Example 5, the bisacetoacetate is prepared from 97.7 g of dewatered polyethylene glycol having on average 44 ethyleneoxy units and 9.0 g of diketene and is freed from excess diketene. With vigorous stirring, 385 g of the aminopropyl-PDMS used in Example 5 (200 meq of NH$_2$) are metered in. After 2 hours at 50° C., an at least slightly turbid, yellowish oil, whose $^1$H-NMR spectrum no longer has a signal for the acetoacetate group, is obtained from the milky mixture. Instead, the structural element identical to the product from Example 6 can be confirmed on the basis of the CH$_3$ peak. The copolymer contains excess aminopropylene terminal groups in a concentration of 0.20 meq/g.

EXAMPLE 8

The preparation of the polyether bisacetoacetate according to Example 5 is repeated. 10.6 g of the product obtained are mixed with 68 g of the commercially available aminosiloxane from Example 1 with vigorous stirring. With gentle heating, the viscosity increases first slowly and then to a greater and greater extent. The still turbid mixture is poured into a Teflon mold. The copolymer solidifies to a slightly yellowish elastomer whose polyether and siloxane constituents are linked to one another via elements of the structure —O$_2$C—CH═C(CH$_3$)—NH—C$_2$H$_4$—NH—C$_3$H$_6$—.

The invention claimed is:

1. An organosilicon compound comprising at least one Si-bonded radical of the formula (E$^1$)$_x$Z—Y—C(O)—CR$^4$═C(CH$_2$R$^4$)—NR$^2$—R$^1$—  (I), prepared by reacting at least one aminosilicon compound (2) with at least one compound (3) of the formula

(E$^2$)$_x$Z—Y—C(O)—CR$^4$═C(CH$_2$R$^4$)—OH  (II) or

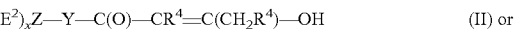
(E$^2$)$_x$Z—Y—C(O)—CHR$^4$—C(O)—CH$_2$R$^4$  (III)

in which
R$^1$ is an organic radical optionally containing one or more N atoms,
R$^2$ is a hydrogen radical or an organic radical having 1 to 30 C atoms,
R$^4$ is a hydrogen radical or a hydrocarbon radical having 1 to 18 C atoms,
Y is O or NR$^2$,
Z is a bi- to hexafunctional organic radical which has a monomeric, oligomeric or polymeric structure and a heteroatom content of at least 10% by weight and is bonded via C atoms,
E$^1$ is a monofunctional terminal group or an Si—C-bonded radical of the formula —Y—C(O)—CR$^4$═C(CH$_2$R$^4$)—NR$^2$—R$^1$—,
E$^2$ is a monofunctional terminal group or a radical of the formula —Y—C(O)—CR$^4$═C(CH$_2$R$^4$)—OH or —Y—C(O)—CHR$^4$—C(O)—CH$_2$R$^4$, and
x is an integer from 1 to 5,
wherein the organosilicon compound is an aminosiloxane containing dimethylsiloxy units.

2. The organosilicon compound of claim 1, wherein $R^1$ is a bifunctional hydrocarbon radical which may contain one or more N atoms, $R^2$ and $R^4$ are each a hydrogen atom,
Y is an oxygen atom,
Z has a heteroatom content of at least 20% by weight, and
x is 1.

3. The organosilicon compound of claim 1, wherein $R^1$ is a bifunctional hydrocarbon radical which may contain one or more N atoms, $R^2$ and $R^4$ are each a hydrogen atom,
Y is an oxygen atom,
Z has a heteroatom content of at least 25% by weight, and
x is 1.

4. The organosilicon compound of claim 1, wherein the heteroatoms are selected from the group consisting of the O, N, B, P, S and mixtures thereof.

5. The organosilicon compound of claim 1, wherein the heteroatoms are selected from the group consisting of N, O, and mixtures thereof.

6. The organosilicon compound of claim 1, wherein the aminosilicon compound (2) is an aminoalkyl-functional siloxane.

7. The organosilicon compound of claim 1, prepared by a method comprising reacting at least one aminosilicon compound (2) with a compound (3) of the formula

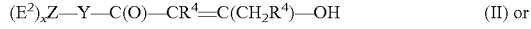 (II) or

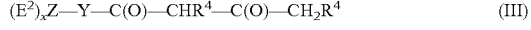 (III)

in which
$R^1$ is an organic radical optionally containing one or more N atoms,
$R^2$ is a hydrogen radical or an organic radical having 1 to 30 C atoms,
$R^4$ is a hydrogen radical or a hydrocarbon radical having 1 to 18 C atoms,
Y is O or $NR^2$,
Z is a bi- to hexafunctional organic radical which has a monomeric, oligomeric or polymeric structure and a heteroatom content of at least 10% by weight and is bonded via C atoms,
$E^2$ is a monofunctional terminal group or a radical of the general formula —Y—C(O)—$CR^4$=C($CH_2R^4$)—OH or —Y—C(O)—$CHR^4$—C(O)—$CH_2R^4$, and
x is an integer from 1 to 5.

8. The organosilicon compound of claim 7, wherein the aminosilicon compound (2) is an aminosiloxane which contains at least one primary amino group.

9. The organosilicon compound of claim 8, wherein the compound (2) contains a secondary amino group bonded to the same Si atom as a primary amino group.

10. The organosilicon compound of claim 8, wherein the compound (2) has an amino group concentration in the range from 0.01 to about 10 meq/g.

11. The organosilicon compound of claim 8, wherein the compound (2) has an amino group concentration in the range from 0.05 to about 5 meq/g.

12. The organosilicon compound of claim 8, wherein the compound (2) has a viscosity in the range from about 100 to 100,000 mPa·s at 25° C.

13. The organosilicon compound of claim 8, wherein the compound (2) has a viscosity in the range from about 500 to 50,000 mPa·s at 25° C.

* * * * *